United States Patent
Kenny et al.

(10) Patent No.: US 6,409,147 B1
(45) Date of Patent: Jun. 25, 2002

(54) THERMALLY OPERATED VALVE FOR AUTOMATICALLY MODULATING THE FLOW OF FLUIDS

(75) Inventors: Thomas M. Kenny, 693 Nantmeal Rd., Glenmoore, PA (US) 19343; Peter Hoynash, Perkiomenville, PA (US); Vincent F. Pettinato, Warminster, PA (US); Bruce S. Mitchell, Hatfield, PA (US)

(73) Assignee: Thomas M. Kenny, Glenmoore, PA (US)

( * ) Notice: Subject to any disclaimer, the term of this patent is extended or adjusted under 35 U.S.C. 154(b) by 0 days.

(21) Appl. No.: 09/592,821

(22) Filed: Jun. 13, 2000

(51) Int. Cl.[7] .......................... F16K 31/12; G05D 23/12
(52) U.S. Cl. ...................... 251/268; 251/11; 236/93 A; 236/56
(58) Field of Search ................ 251/11, 4, 366, 251/5, 268; 236/93 A, 56

(56) References Cited

U.S. PATENT DOCUMENTS

| | | | |
|---|---|---|---|
| 2,241,086 A | * | 5/1941 | Gould ...................... 251/11 X |
| 2,590,215 A | | 3/1952 | Sausa |
| 2,842,331 A | | 7/1958 | Anderson |
| 2,884,866 A | | 5/1959 | Patterson |
| 2,902,222 A | | 9/1959 | Noakes |
| 3,017,903 A | | 1/1962 | Steffens |
| 3,022,670 A | | 2/1962 | Sutliffe, Jr. |
| 3,145,967 A | | 8/1964 | Gardner |
| 3,353,560 A | | 11/1967 | McCulloch |
| 3,514,034 A | | 5/1970 | Cushman |
| 3,687,365 A | | 8/1972 | Laessig |
| 3,901,438 A | | 8/1975 | Christiansson |
| 4,114,640 A | | 9/1978 | Forman |
| 4,454,983 A | | 6/1984 | Tarvis, Jr. |
| 4,569,502 A | | 2/1986 | Elliott |

(List continued on next page.)

OTHER PUBLICATIONS

Photocopy of guide "Steam and Steam Trapping", cover page and pp. 1–20, Spirax Sarco Ltd>, 1982.

Photocopy of brochure "Bestobell Steam—Steam Traps and Steam Specialties", by Bestobell Steam (Admitted prior art).

Photocopy of brochure "Pinch Steam Trap," by Ogontz Corporation, and contents thereof. (Applicants admit the "Pinch Steam Trap" shown in the brochure was sold in the United States prior to Jun. 13, 1999.)

*Primary Examiner*—Kevin Lee
(74) *Attorney, Agent, or Firm*—Akin, Gump, Strauss, Hauer & Feld, L.L.P.

(57) ABSTRACT

A valve for automatically modulating a flow of fluid. The valve includes a flexible flow adjustment member having a variable diameter passage therethrough and an outer surface and a shell surrounding at least a portion of the outer surface and creating a void between the shell and the outer surface. The shell is in contact with the flow of fluid. The valve further includes a thermally reactive material that expands when heated and contracts when cooled. The thermally reactive material is within the void and is in contact with the outer surface of the flexible flow adjustment member. The thermally reactive material exerts pressure on the flexible flow adjustment member in response to a heating of the thermally reactive material to cause the variable diameter passage to close and to relieve pressure thereon in response to a cooling of the thermally reactive material to permit the variable diameter passage to open. The flow of condensate is permitted to pass through the variable diameter passage at an average temperature that generally parallels the average temperature of saturated steam within the steam system within a range of about 0 to 40 percent. The average maximum temperature of condensate flow permitted to pass through the variable diameter passage differs from the average minimum temperature of condensate flow permitted to pass through the variable diameter passage by up to about 25 degrees Fahrenheit.

6 Claims, 9 Drawing Sheets

U.S. PATENT DOCUMENTS

| | | |
|---|---|---|
| 4,790,344 A | 12/1988 | Chauvier et al. |
| 4,877,053 A | 10/1989 | Yusko, Jr. et al. |
| 4,895,341 A | 1/1990 | Brown et al. |
| 4,899,783 A | 2/1990 | Yusko, Jr. et al. |
| 5,107,883 A | 4/1992 | Shaw |
| 5,118,071 A * | 6/1992 | Huelle .................. 251/11 |
| 5,546,757 A | 8/1996 | Whipple, III |
| 6,102,897 A | 8/2000 | Lang |

* cited by examiner

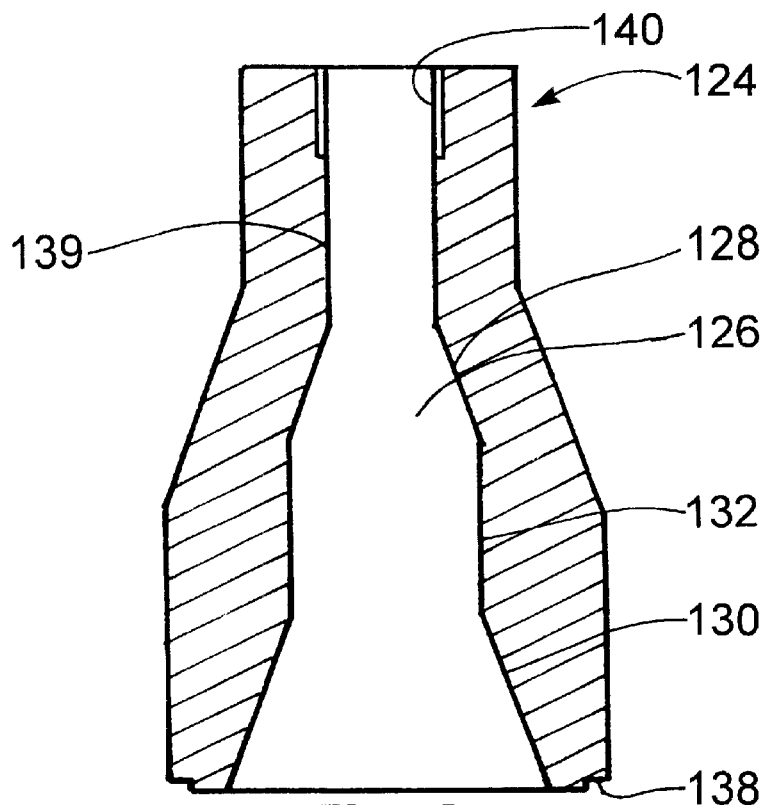
Fig. 8
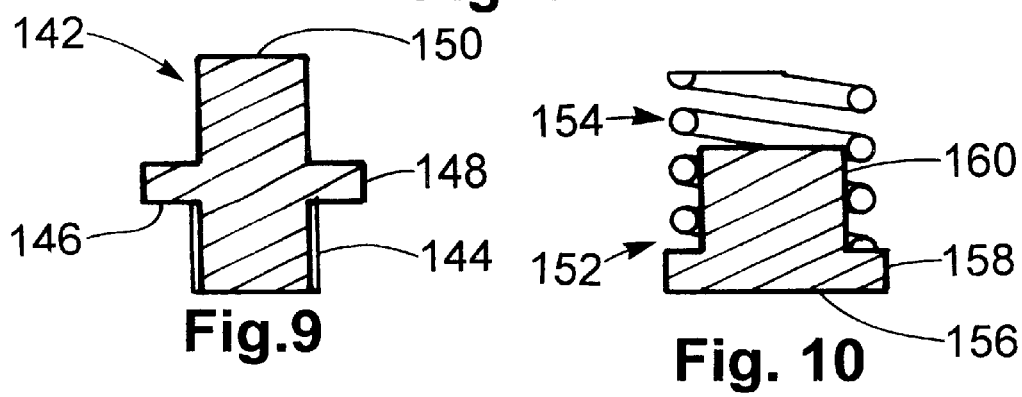
Fig. 9
Fig. 10
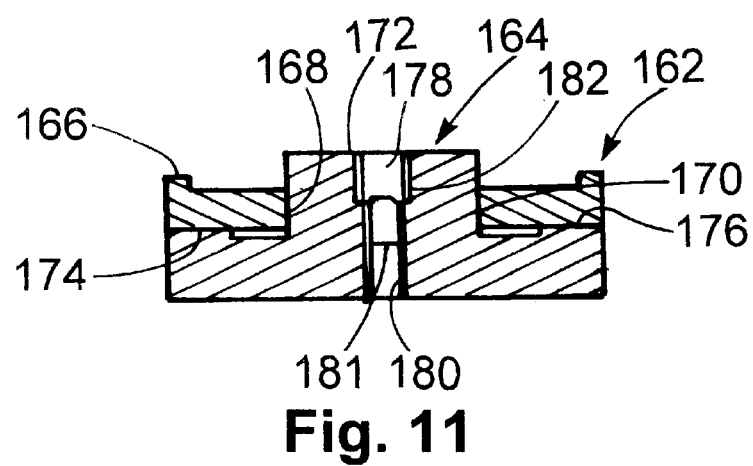
Fig. 11

THERMALLY OPERATED VALVE FOR AUTOMATICALLY MODULATING THE FLOW OF FLUIDS

BACKGROUND OF THE INVENTION

The present invention relates to thermally operated valves and, more particularly, to a thermally operated valve which automatically modulates the flow of fluids therethrough.

In the design, construction and operation of manufacturing, process and chemical plants, the control of fluid flow is a major concern to the design and operating engineer. It is also critical in environmental heating and cooling systems. The size and type of valves utilized at various control points result in a major portion of the cost of design and construction. In many applications it is desired to automatically control the flow of the fluid through a pipe, wherein the opening or closing action is effected directly by the temperature of the fluid flow being controlled. While one of the largest applications for this type of valve is the steam trap, there are many additional uses for valves of this type. For the purpose of clarification, the utility of the control valve of this invention will be described as it is applied to the steam trap application, but the control valves of this invention are not limited to that application.

In process or manufacturing plants, the steam trap provides an extremely important function. When operating properly and efficiently, it reduces the waste of energy and conserves heat energy in the system. However, when it is inoperable or performing inefficiently through corrosion, dirt, misuse, or simply through selection and installation of a valve of the wrong size or type, heat and energy losses are substantial. Steam, as it releases its heat units through process application, pipe radiation loss, or by other means, ultimately returns to its water or condensate state. If this condensate is not drained immediately or trapped from the system, it reduces the operating efficiency by slowing the heat transfer process and can actually cause physical damage to the equipment.

The condensate accumulates along the bottom of horizontal pipe and is swept along by the steam flow passing over it. Depending upon the volume and velocity, condensate may collect and fill the pipe, continuing to be swept along by the steam flow. If the velocity is sufficient, this water flow can do substantial damage to the equipment. It is therefore desirable in essentially all steam operated systems to remove the condensate as often and as efficiently as is practically possible. The condensate typically forms and collects at elevation changes such as risers and expansion loops, at all low points and on long horizontal runs and, of course, ahead of all dead-end areas, such as shut off valves, pressure and temperature control valves and at the ends of steam mains. In particular it is important to remove condensate ahead of humidifiers, pumps, turbines and other equipment where water droplets may damage the equipment. In order to improve efficiency, steam traps are used downstream from heat exchangers, coils, unit heaters, cooking kettles, dryers, and the like. The temperature at which the condensate is discharged may be quite important to maintaining energy efficiency.

With all these various uses and positions for steam traps in the process system, and because of the physical and performance limitations on the various types of steam traps, many different types have been designed and marketed. While all of the many different types of steam traps operate by sensing the difference between steam and condensate, they may be classified as density operated (mechanical), temperature operated (thermostatic) and kinetic energy operated (disc and orifice). All of these various types have been necessary because of the limitations of the performance of the traps and not necessarily due to the result of the specific operating principle involved. Thus, although the device of this invention is temperature operated, it does not necessarily fall into the same category or have the limitations of the temperature operated steam traps presently available which include the balance-pressure thermostatic traps and the thermostatic traps which are characterized as liquid-expansion and bi-metal expansion traps. The operation, advantages, and limitations of these various types of traps are well known to process engineers and are described in Bulletin Number T-511 printed April, 1979 by Sarco Company, 1951 26th Street, S.E., Post Office Box 119, Allentown, Pa. 18105, entitled "Steam Trap Selection and Application Guide," incorporated herein by reference. As will be clear from this "Guide," the choice of the particular kind of trap is important for the application and needs of the particular situation.

The "choice" problem relates not only to the type of trap, but also to the size of the trap, thereby requiring a thorough study of the rate of the expected flow and the characteristics of that flow before choosing the particular type and size of trap. These traps are expensive, complicated, and their selection involves a substantial portion of the total planning time in construction of a system. An incorrect choice of type or even size can result in poor performance or even complete lack of performance and could potentially damage equipment. Because of the nature of the device, it is common to use larger steam traps than necessary as they provide a substantial safety. factor, and if the steam trap is found to be too small for the particular location, substantial expense and delay may be required before the system becomes operational. However, a trap having a capacity which is greater than system requirements may be energy inefficient and is certainly more costly. In addition, redundant systems are required because steam traps create notorious maintenance problems and are likely to need regular servicing. Strainer plugging is a common problem. As the steam trap ages, inefficiencies set in due to wear and due to deposition of various solids at the critical moving parts. It is common to fix or replace the steam traps in an entire system at regular intervals.

A particular problem with essentially all of the prior steam traps is determining how well the device is performing. In many applications, a substantial steam leak which results in energy losses cannot be easily detected. Such techniques as ultrasonic detection and other diagnostic tools are necessary to study the trap operation while "on stream." Many of the more costly and more efficient steam trap devices, however, are affected by particulates such as dirt or scale that might clog the working mechanism of the trap. This requires filtration upstream through the use of strainers and other such devices.

With the importance of energy conservation, particularly in process plant and boiler operations, even on a small scale, the steam trap and its efficient performance is a major concern. However, nothing has been offered as a satisfactory solution of various limitations of the presently available steam traps. These limitations include low thermal efficiency under varying loads and pressures, allowing steam loss during operation, the necessity of maintaining a water seal to avoid continuous discharge of steam, protection from freezing, limited discharge of condensate on a continuous basis, limited air venting capacity, inability to adjust the trap on-stream limited use with super heated steam, on-stream damage due to water hammer, closure of the trap due to failure, protection from any steam impingement that might damage the equipment, failure to be self-adjusting to various pressure changes of the steam flow, requiring an open discharge outlet at the site of use, inconsistent operation particularly upon aging, being limited to low pressure operation, the design or construction requiring continuous steam bleed resulting in substantial waste even with light loads, use of mechanical parts which are subject to sticking, water logging of the flow system because of condensate holdback, and being limited to certain inlet pressures. These limitations are not present in all types of steam traps, but each type of steam trap suffers with some of these limitations and even the best choice leaves some disadvantages.

None of the prior art devices have provided a solution to the limitations of the steam traps and control valves as outlined above. Accordingly, it is an object of this invention to provide a control valve that operates on the principle of temperature increase in a fluid stream to control the rate of flow of that fluid. The present invention provides a steam trap that does not use a mechanical float or thermo-expansion of a bellows to close or open a machined orifice with a tapered plug. Accordingly, this invention provides a steam trap design that is not prone to wear, plugging, or substantial maintenance problems relating to internal components of typical steam traps. Furthermore, the present invention provides a trap that is not affected by or subject to freezing, due to the requirement of a condensate reservoir or the internal design of the device. The present invention also vents all system air, accumulated water and non-condensables as soon as possible and provides a cold port opening through the steam trap. The present invention also provides a flow path adequate to pass particulates and fluid surges without clogging or restriction of flow.

The present invention is multipurpose in nature, such that it may be used with a wide range of condensate flow rates, operating pressures, pipe sizes and system applications. Further, the present invention provides a trap with essentially no metal wear parts, and which is capable of insertion in-line and is compact in size by comparison with present steam traps. It is not limited to use as a stream trap, but can be used in any setting where a fluid flow must be modulated or controlled in response to an input temperature.

The present invention also operates such that cooler temperatures expand the orifice and increase flow through the trap to provide a quick and complete discharge of condensate liquid, particularly on start-up conditions. Unlike prior art devices, the present invention provides very rapid response to direct steam contact with the trap and to changes in the temperature of the flow generally. Further, the valve of the present invention provides a closure valve that will compensate for erosion of the inside surface to prevent leakage. For increased safety over prior art designs, the valve of the present invention will not remain in the closed position in the event of a failure, but will return to the open position. For increased economic efficiency, the valve of the present invention has a long performance life and will be less expensive to install and operate.

It will be understood that the valve of the present invention is not limited to application as a steam trap in a steam system but may be used in any setting where a fluid flow must be modulated or controlled in response to an input temperature.

BRIEF SUMMARY OF THE INVENTION

A valve for automatically modulating a flow of fluid. The valve includes a flexible flow adjustment member having a variable diameter passage therethrough and an outer surface and a shell surrounding at least a portion of the outer surface and creating a void between the shell and the outer surface. The shell is in contact with the flow of fluid. The valve further includes a thermally reactive material that expands when heated and contracts when cooled. The thermally reactive material is within the void and is in contact with the outer surface of the flexible flow adjustment member. The thermally reactive material exerts pressure on the flexible flow adjustment member in response to a heating of the thermally reactive material to cause the variable diameter passage to close and to relieve pressure thereon in response to a cooling of the thermally reactive material to permit the variable diameter passage to open. A substantial portion of the thermally reactive material is configured to change phase to vapor in response to an increase in temperature within the internal cavity.

In another aspect, the present invention is directed to a valve for automatically modulating a flow of fluid. The valve includes a flexible flow adjustment member having a variable diameter passage therethrough and an outer surface. The valve also includes a shell surrounding at least a portion of the outer surface and creating a void between the shell and the outer surface. The shell is in contact with the flow of fluid. A thermally reactive material that expands when heated and contracts when cooled, the thermally reactive material is within the void and in contact with the outer surface of the flexible flow adjustment member. The thermally reactive material exerts pressure on the flexible flow adjustment member in response to a heating of the thermally reactive material to cause the variable diameter passage to close and to relieve pressure thereon in response to a cooling of the thermally reactive material to permit the variable diameter passage to open. The thermally reactive material includes about twenty to fifty percent glycerin by volume, about zero to twenty percent water by volume, and about fifty to sixty percent alcohol by volume.

In another aspect, the present invention is directed to a valve for automatically modulating a flow of condensate from a steam system that includes steam at a saturation temperature. The valve includes a flexible flow adjustment member having a variable diameter passage therethrough and an outer surface. The valve also includes a shell surrounding at least a portion of the outer surface and creating a void between the shell and the outer surface. The shell is in contact with the flow of fluid. The valve also includes a thermally reactive material that expands when heated and contracts when cooled. The thermally reactive material is within the void and in contact with the outer surface of the flexible flow adjustment member for exerting pressure thereon in response to a heating of the thermally reactive material to cause the variable diameter passage to close and to relieve pressure thereon in response to a cooling of the thermally reactive material to permit the variable diameter passage to open. The flow of condensate is permitted to pass through the variable diameter passage at an average temperature that generally parallels the average temperature of saturated steam within the steam system within a range of about 0 to 40 percent. The average maximum temperature of condensate flow permitted to pass through the variable diameter passage differs from the average minimum temperature of condensate flow permitted to pass through the variable diameter passage by up to about 25 degrees Fahrenheit.

In another aspect, the present invention is directed to a valve for automatically modulating a flow of condensate from a steam system. The valve includes a housing having a wall defining an interior cavity. The interior cavity is in fluid communication with the steam system. A modulator is mounted within the interior cavity. The modulator includes a shell in fluid communication with the steam system and a flexible flow adjustment member within the shell. The flexible flow adjustment member has a variable diameter passage therethrough. The variable diameter passage is in fluid communication with the steam system. The modulator includes a void between the flexible flow adjustment member and the shell and a thermally reactive material within the void. The thermally reactive material is in contact with the shell for thermal communication therebetween. At least a portion of the thermally reactive material is configured to change phase to vapor in response to an increase in temperature within the internal cavity.

In another aspect, the present invention is directed to a valve including a housing having a wall defining an interior cavity. The valve also includes a modulator mounted within the interior cavity. The modulator includes a shell in fluid communication with the interior cavity and a flexible flow adjustment member within the shell. The flexible flow adjustment member has a variable diameter passage therethrough. The variable diameter passage is in fluid communication with the interior cavity. The modulator also includes a void between the flexible flow adjustment member and the shell and a thermally reactive material within the void and in contact with the shell for thermal communication therebetween. At least a portion of the thermally reactive material is configured to change phase to vapor in response to an increase in temperature within the interior cavity.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 8 is an elongated cross-sectional detail view of a receiver of the compression tool shown in FIG. 5;

FIG. 9 is a cross-sectional view of an end plug of the compression tool shown in FIG. 5;

FIG. 10 is a cross-sectional detail view of a plunger and coil spring of the compression tool shown in FIG. 5; and FIG. 11 is a cross-sectional detail view of a base plate and retainer plate of the compression tool shown in FIG. 5;

DETAILED DESCRIPTION OF THE INVENTION

Figure 1:
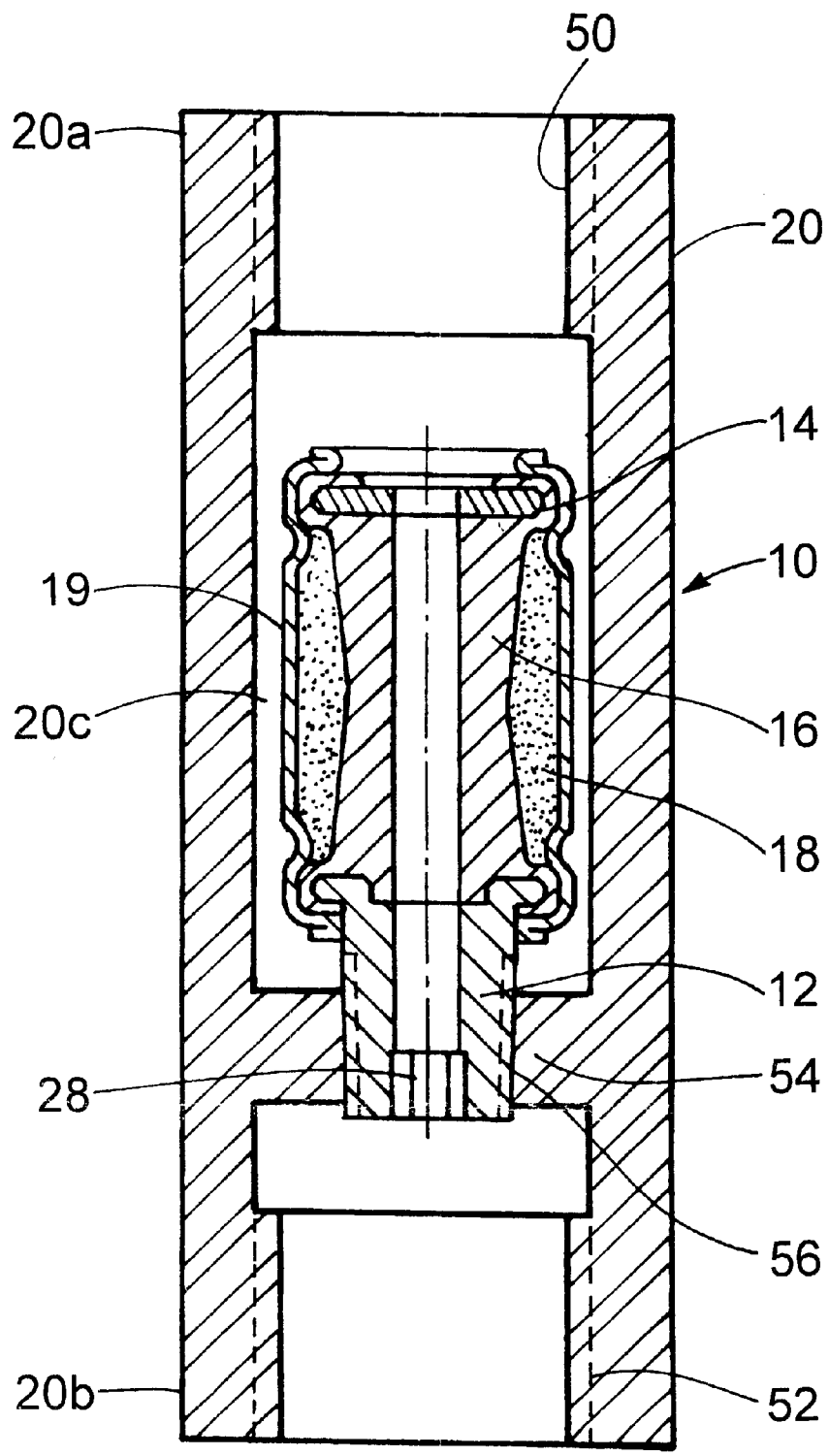
FIG. 1 is a cross-sectional view of a thermally operated valve in accordance with a preferred embodiment of the present invention.

As used in the claims, "a" is defined as "at least one". In the drawings, like numerals are used to indicate like elements throughout. Referring to the drawings in detail, there is shown in FIG. 1 a cross-sectional view of a valve 10 in accordance with the present invention. The valve 10 of the preferred embodiment includes a flanged nipple 12, an end washer 14, a flexible flow adjustment member 16, thermally reactive material 18, a shell 19, and a housing 20.

Figure 2:
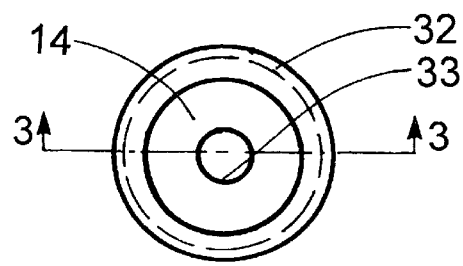
FIG. 2 is a top plan view of a modulator in accordance with the preferred embodiment shown in FIG. 1, taken along line 2—2 of FIG. 1.
Figure 4:
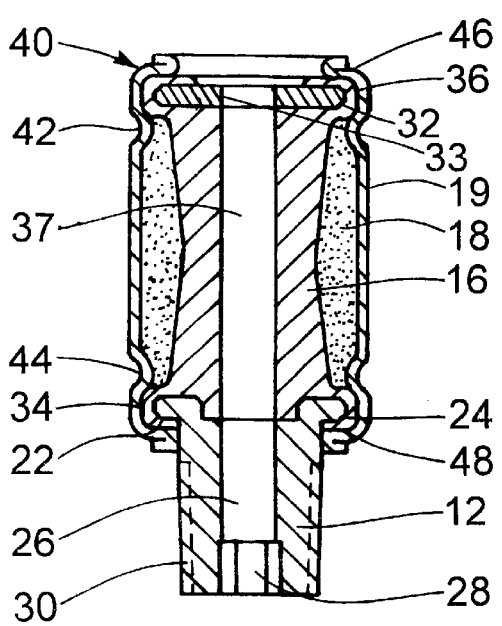
FIG. 4 is a complete cross-sectional view of the modulator for the thermally operated valve shown in FIG. 2 taken along line 3—3 of FIG. 2.
Figure 3:
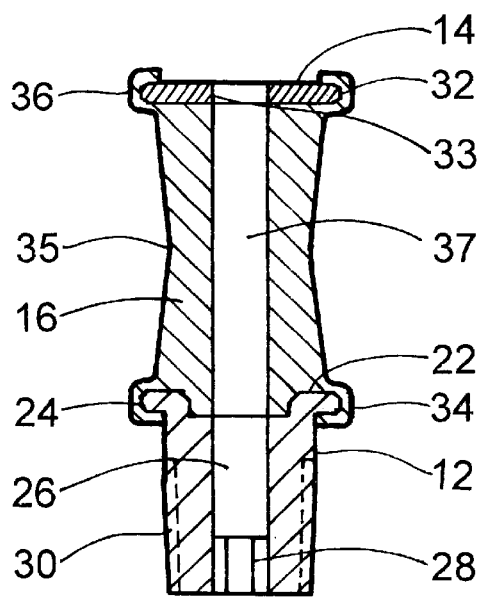
FIG. 3 is a partial cross-sectional view of the end washer, flexible flow adjustment member and flanged nipple of the modulator shown in FIG. 2 taken along line 3—3 of FIG. 2.

Referring now to FIGS. 2–4, the flanged nipple 12 is positioned adjacent to a first end of the flexible flow adjustment member 16, and is preferably made of brass by methods, such as machining, well-known to those skilled in the art. Alternatively, the flanged nipple 12 could be made of bronze, copper, polymeric material, stainless steel or one of a number of other materials well known to those skilled in the art to offer structural strength, thermal stability, and resistance to corrosion. The flanged nipple 12 has on a first end a flange 22 which is sealingly engaged with a first end of the flexible flow adjustment member 16, as will be discussed more fully below. The outer circumferential edge 24 of the flange 22 is preferably circular and the edges of the outer circumferential surface 24 are preferably chamfered, for reasons which will become apparent when discussed below. The flanged nipple 12 has a bore 26 centrally disposed therethrough which permits the passage of gasses, vapors, liquids, and mixtures of these through the flanged nipple 12 and into the flexible flow adjustment member 16. The size of the bore 26 can be varied depending upon the flow capacity desired of the valve 10. Preferably, the bore 26 is approximately 0.156 inches in diameter. When used as a "steam trap" within a steam system generally including steam and condensate, a bore 26 of this size can accommodate condensate flow rates of approximately 660 pounds per hour at 10 pounds per square inch, 1,485 pounds per hour at 50 pounds per square inch, 2,099 pounds per hour at 100 pounds per square inch, and 2,565 pounds per hour at 150 pounds per square inch (each based on water at 60 degrees Fahrenheit). It will be obvious to those skilled in the art having read this disclosure that a larger diameter bore 26 would permit greater flow rates and a smaller diameter would permit lesser flow rates.

A second end of the flanged nipple 12 opposite the flange 22 has external threads 30 on its outer surface for attachment to the housing 20, as described herein. In the preferred embodiment, the external threads 30 are American National Standard Taper pipe threads made pursuant to ANSI/ASME B1.20.1-1983, having a taper of one in sixteen or 0.75 in/ft. Preferably the external threads 30 are 1/8-27 NPT male pipe threads, however, the pipe threads may be any size that will accommodate the desired diameter of the bore 26 and that will accommodate pressure-tight attachment to the housing 20. Alternatively, the flanged nipple 12 could have female threads (not shown) which would mate with male threads (not shown) on the housing 20, or the union between the flanged nipple 12 and the housing 20 could be one of a number of alternative configurations known to those skilled in the art such as a compression-type fitting, pressed fitting, or crimped fitting. Opposite the flange 22, the bore 26 includes a hexagonal interior shape 28. This hexagonal interior shape 28 is sized to fit a standard hex key or Allen wrench (not shown) used for applying torque to the flanged nipple 12 for assembly of the valve 10, which will be described fully below. Use of a hexagonal interior shape 28 and a hex key is the preferred method for installation of the flanged nipple 12 into the housing 20, however, other features that would facilitate installation of the flanged nipple 12 into the housing 20 could be used. For instance, a slotted end on the flanged nipple 12 could be used without departing from the spirit and scope of the invention.

Spaced apart from the flange 22 at the opposite end of the flexible flow adjustment member 16 is a flat end washer 14 having an orifice 33 therethrough. The end washer 14 is preferably made from brass, and made by a machining process, but may be made from any material which will be substantially dimensionally stable and rigid throughout the intended temperature range in which the valve 10 will be used, such as stainless steel and by any conventional process known to those skilled in the art for making flat washers. The outer circumferential edge 32 of the end washer 14 is preferably the same size and shape as the outer circumferential edge 22 of the flange 22. Those skilled in the art will recognize upon reading this disclosure that the two outer circumferential edges 22, 32 need not be the same diameter but could have diameters different from one another if accommodation is made in the flexible flow adjustment member 16 and shell 19, as will become apparent below. The edges of the outer circumferential edge 32 of the end washer 14 are preferably chamfered for reasons which will be discussed below. The end washer 14 has an orifice 33 therethrough. The orifice 33 is in fluid communication with the variable diameter passage 37 and the bore 26. The orifice 33 preferably is the same size as the bore 26, but may alternatively be larger than the bore 26 without departing from the spirit and scope of the invention. It is desired, however, that the orifice 33 not be smaller than the diameter of the bore 26, otherwise the end washer 14 may undesirably restrict flow through the valve 10.

The flexible flow adjustment member 16 is essentially a flexible tube having a variable diameter passage 37 therethrough and an outer surface 16a. It is located essentially between the end washer 14 and the flange 22 and preferably encompasses at least the outer circumferential edges 24, 32 of the flange 22 and end washer 14, respectively, for reasons that will be discussed below with regard to assembly. In the preferred embodiment, the portion of the flexible flow adjustment member 16 which encircles the outer circumferential edges 24, 32 of the flange 22 and end washer 14 respectively is at least 0.0625 inches thick to provide sealing surfaces 34, 36 on the flange 22 and end washer 14, respectively. Those skilled in the art will recognize having read this disclosure that the thickness may be either more or less than 0.0625, so long as there is a sufficient thickness of material covering the outer circumferential edges 24, 32 to form a pressure-tight seal between the flexible flow adjustment member 16 and the shell 19, thereby creating a sealed void 17 between the flexible flow adjustment member 16 and the shell 19, as discussed below. It is contemplated that the flexible flow adjustment member 16 need not be interposed between the shell 19 and outer circumferential edges 24, 32, and that the sealed void 17 may be created by any method that would provide a sealed region between the shell 19 and flexible flow adjustment member 16 such as by sealing the flexible flow adjustment member 16 directly to the shell 19 without the use of an end washer 14 or flanged nipple 12 (not shown).

The flexible flow adjustment member 16 must be selected to have the necessary closure and opening capabilities through a range of temperatures and provide a long life upon steady exposure to fluids, etc., at elevated temperatures. The flexible flow adjustment member 16 is made of an elastomeric material, preferably VITON elastomeric material, and most preferably VITON GF300 manufactured by E.I. du Pont de Nemours & Co., Inc. located in Wilmington, Del., but may be made from other resilient materials well known to those skilled in the art such as neoprene, butyl rubber, silicone, urethane rubber, EPDM, Hypalon, Viton-A, Viton-B, and Nordel elastomers. Hypalon, Viton-A, Viton-B and Nordel are also manufactured by E.I. duPont de Nemours & Co., Inc. located in Wilmington, Del. In a preferred embodiment, the flexible flow adjustment member 16 is made by a process of molding, wherein the flanged nipple 12, end washer 14, and flexible flow adjustment member 16 are assembled together as a unitary piece, as best shown in FIGS. 2 and 3.

The variable diameter passage 37 passes longitudinally through the flexible flow adjustment member 16, thereby providing a constrictable flow path through the valve 10 in fluid communication with an interior cavity 20c of the housing 20 (discussed below), the orifice 33, and the bore 26, and when the valve 10 is used as a steam trap, the variable diameter passage 37 is, of course, in fluid communication with the steam system. The means of constricting the variable diameter passage 37 will be described below. Preferably, the variable diameter passage 37 has a diameter equal to that of the bore 26 through the flanged nipple 12 to minimize turbulence through the valve 10. Those skilled in the art will recognize upon reading this disclosure that the variable diameter passage 37 may be larger than the diameter of the bore 26 if the bore 26 alone is desired to control maximum flow rate through the valve 10, and may be smaller than the diameter of the bore 26 if the variable diameter passage 37 alone is desired to control maximum flow rate. In a preferred embodiment, wherein the valve 10 is to be used as a steam trap, the variable diameter passage 37 is preferably 0.156 inches in diameter. However, those skilled in the art will recognize that the variable diameter passage 37 may be of any diameter that will permit a predetermined flow through the valve 10 and will permit the diameter to be reduced to a point where flow through the valve 10 is terminated, as described below. One substantial benefit of the nature of the material and construction of the flexible flow adjustment member 16 is the ability to seal off flow tightly even if contamination such as dirt is present in the variable diameter passage 37.

The outer surface 16a of the flexible flow adjustment member 16 is preferably reduced in circumference at its longitudinal midpoint 35 to facilitate compression (described more fully below) in that region of the flexible flow adjustment member 16, thereby facilitating the reduction in or termination of flow through the valve 10. The region of reduced outer circumference also creates the inner boundaries of the sealed void 17 between the flexible flow adjustment member 16 and the shell 19 wherein the thermally reactive material 18 is encapsulated thus positioning the thermally reactive material 18 in contact with the shell 19 and the flexible flow adjustment member 16. It will be recognized by those skilled in the art upon having read this disclosure that the flexible flow adjustment member 16 need not have a region of reduced outer circumference at its midpoint 35, but may have an outer diameter that is equivalent across substantially the entire distance between the end washer 14 and the flange 22.

Reference is now made to FIG. 4. A shell 19 sealingly engages the sealing surfaces 34, 36 and in its unbent form (not shown) preferably extends at least 0.0625 inches beyond each end of the flexible flow adjustment member 16. The shell 19 is essentially a short length of tube, and is preferably of round cross-section where, as discussed above, the flange 22 and end washer 14 are made in a preferred circular shape. The shell 19 preferably has a slip fit over the flexible flow adjustment member 16 such that the shell may be slipped over the flexible flow adjustment member 16 from an end of the flexible flow adjustment member 16. The shell 19 is preferably made of brass, however, those skilled in the art having read this disclosure will recognize that the shell 19 could be made from any malleable metal which has high thermal conductivity, such as stainless steel. The malleability of the material is important due to the method of attaching the shell 19 to the flexible flow adjustment member 16, discussed below. High thermal conductivity is important because, in a thermally-reactive valve such as the present invention, temperature changes must be rapidly detected and reacted to by the valve 10. It is also preferred that the shell 19 has a high degree of corrosion resistance. This may dictate different materials depending upon the environment in which the valve 10 is used. The wall thickness of the shell 19 should be sufficient to resist the expansive forces of the thermally reactive material 18 upon heating, as compared to the flexible flow adjustment member 16. Preferably, the wall thickness of the shell 19 is 0.032 inches. The wall thickness of the shell 19 can be varied, thereby varying the thermal conductivity of the shell 19, to impart different temperature-reactive characteristics to the valve 10, thicker wall thickness providing a slower response time, thinner wall thickness providing a more rapid response. This provides the designer with the ability to custom design the response rate of the valve 10 for different applications. The thermal reactivity of the valve 10 can also be manipulated by employing different insulating or conductive coatings on the shell 19. Examples of such coatings are ceramic or PTFE.

As best shown in FIGS. 1 and 4, the thermally reactive material 18, which expands in reaction to an increase in its temperature and contracts in reaction to a decrease in its temperature, encircles the flexible flow adjustment member 16 in the sealed void 17 created between the shell 19 and the outer surface of the flexible flow adjustment member 16. Thus, the thermally reactive material 18 is in contact with the outer surface 16a of the flexible flow adjustment member 16 for executing pressure thereon in response to a heating of the thermally reactive material 18, thus causing the diameter of the variable diameter passage 37 to decrease. Conversely, the thermally reactive material 18 relieves pressure on the outer surface 16a in response to a cooling of the thermally reactive material 18 to permit the diameter of the variable diameter passage 37 to increase. While it is preferred that the void 17, and hence the thermally reactive material 18 encircle the flexible flow adjustment member 16, it is contemplated that the void 17 need not completely encircle the flexible flow adjustment member 16, but need only be in contact with a sufficient portion of the flexible flow adjustment member 16 to cause constriction and to permit expansion in response to changes in temperature and pressure of the steam system. The higher the coefficient of thermal expansion of the thermally reactive material 18 selected, the smaller the sealed void 17 need be. The composition of the thermally reactive material 18 will be described more fully below in relation to the operation of the valve 10.

When the flexible flow adjustment member 16, thermally reactive material 18, end washer 14, flanged nipple 12, and shell 19 are assembled as shown in FIG. 4, they form a modulator 40. The modulator 40 is mounted within the interior cavity 20c (discussed below) and is, therefore, in fluid communication with the steam system. It should be understood that the shell 19 and variable diameter passage 37 are in fluid communication with the interior cavity 20c and, when the valve 10 is used as a steam trap, with the steam system. Referring now to FIG. 4, the modulator 40 is assembled as follows. The flexible flow adjustment member 16 is inserted most of the way into the shell 19 such that only a small portion of the void 17 is visible or accessible. The thermally reactive material 18, which is generally in a liquid state at the environmental conditions of assembly, is injected into the void 17 whereupon the flexible flow adjustment member 16 is inserted the remainder of the way into the shell 19.

This assembly comprising the shell 19, flanged nipple 12, end washer 14, flexible flow adjustment member 16, and thermally reactive material 18 is then placed in a compression tool 100 (shown in FIG. 5 and described below) wherein the sleeve 19 is compressed or crimped onto the assembled flexible flow adjustment member 16, end washer 14 and flanged nipple 14 such that the inner circumference of the shell 19 forms a pressure-tight seal with the sealing surfaces 34, 36 of the flexible flow adjustment member 16. It will now become apparent that the flange 22 and end washer 14 provide a rigid backing, holding the flexible flow adjustment member 16 in sealing engagement with the inner circumference of the shell 19. This sealing engagement is enhanced due to the shape of the compressed portion of the shell 19, having circumferential indentations 42, 44 immediately inboard from the end washer 14 and flange 22, respectively, and rounded over ends 46, 48 immediately outboard from end washer 14 and flange 22, respectively. Those skilled in the art upon reading this disclosure will recognize that other methods of creating a pressure tight void 17 between the shell 19 and the flexible flow adjustment member 16 could be employed, such as through the use of a compression type fitting or threaded fitting. The modulator 40 is installed in the interior cavity 20c of the housing 20 such that the shell 19 is in fluid communication with the stream of fluid through the valve 10.

Referring now to FIG. 1, the housing 20 provides for attachment of the valve 10 to tubing or piping (not shown) of the system into which valve 10 is integrated. The housing 20 has a wall 20d forming an interior cavity 20c, an inlet end 20a and an outlet end 20b. The interior cavity 20c is in fluid communication with the steam system. The housing 20 is preferably generally tubular and has a hexagonal outer shape (not shown) to facilitate gripping the housing 20 with a wrench. It will be recognized by those skilled in the art upon reading this disclosure that the outer shape need not be hexagonal, but may be round and, in such a case, could be gripped by a pipe wrench or similar tool. The housing 20 is preferably made from stainless steel, but those skilled in the art will recognize that other materials, including bronze or polymeric materials, offering high tensile strength and corrosion resistance that would be required in a coupling operating in a harsh environment would also suffice.

Preferably, each end of the housing 20 has internal threads 50, 52 which permit attachment to tubing of the system into which the valve 10 is integrated. The threads 50, 52 are preferably American National Standard Taper pipe thread (ANSI/ASME B1.20.1-1983) having a size of 1/2-14 NPT. Those skilled in the art upon reading this disclosure will recognize that the threads 50, 52 could be either internal or external threads and could be any size that would permit the level of flow for which the valve 10 is rated. Additionally, it is contemplated that the housing 20 could be attached to tubing of the system by any suitable type of attachment mechanism, such as by welding, use of compression fittings, flanged connections, etc.

The housing 20 has in its interior cavity 20c, a radially inwardly extending throat 54 which is used as the point of attachment for the threaded end of the flanged nipple 12. The throat 54 is preferably unitary with the housing 20 and preferably has threads 56 which correspond with the external threads 30 on the flanged nipple 12. As stated above, those skilled in the art, upon reading this disclosure will recognize that alternate means of attaching the flanged nipple 12 to the housing 20 may be employed, such as by using a pressed or compression type arrangement. The throat 54 is preferably located nearer one end of the housing 20 such that when the modulator 40 is installed into the housing 20, the modulator 40 is positioned within the interior cavity 20c essentially equidistant from both ends of the housing 20. Those skilled in the art, upon reading this disclosure, will recognize, however, that the throat 54 need not be located to keep the modulator 40 centrally disposed, but could be located such that the modulator is disposed more toward one end of the housing 20 than the other without departing from the spirit and scope of the invention.

The valve 10 of the preferred embodiment is generally configured or assembled as follows. The modulator 40 is first assembled from its component parts. As discussed above, the flange 22 of the flanged nipple 12 is positioned adjacent to one end of the flexible flow adjustment member 16. A portion of the flexible flow adjustment member 16 encircles the outer circumferential edge 24 of the flange 22 and the outer circumferential edge 32 of the end washer. The flexible flow adjustment member 16 is partially inserted into the shell 19 such that only a small portion of the void 17 is exposed. The thermally reactive material 18 is inserted into the void 17 whereupon the shell 19 is then slipped completely over the assembled components. The end washer 14 is then positioned adjacent to the end of the flexible flow adjustment member 16 and the ends of the shell 19 are compressed (as described in detail below) such that the thermally reactive material 18 is sealed in the void 17 between the shell 19 and the flexible flow adjustment member 16.

Detailed assembly of the housing 20 and modulator 40 of the preferred embodiment is preferably accomplished as follows. The threads 30 of the flanged nipple 12 are threaded into the corresponding threads 56 in the throat 54 of the housing 20 by inserting a hex key (not shown) into the housing 20 through the second end 20b of the housing such that it engages the hex portion 28 at the end of the bore 26 wherein the hex key is then used to tighten the modulator 40 within the housing 20. A pipe thread compound (not shown) or Teflon tape (not shown) is not used to seal the threaded joint between the modulator 40 and the throat 54 because the threads are of the dry seal type. Alternatively, such sealing features could be used if desired. It will be recognized from the foregoing description that the shell 19 will be in contact with a flow of fluid within the system to which the valve 10 is attached. If that system is a steam system, the shell 19 will be in contact, i.e., in fluid communication, with the steam and/or condensate within the system. This is because the shell 19, and in fact, the modulator 40 are within the internal cavity 20c. Likewise, the variable diameter passage 37 will be in contact with the flow of fluid.

Referring now to FIGS. 1 and 4, when used as a steam valve, the preferred embodiment of valve 10 operates as described herein. At startup of the steam system, because the interior cavity 20c is exposed to cool temperatures, the thermally reactive material 18 is in a relatively unexpanded state and thus the pressure in the void 17 is relatively low. As a result, the variable diameter passage 37 is open, thus permitting air, water, and non-compressibles to escape the steam system. As the steam system heats, the thermally reactive material 18, due to its physical characteristic of having a high degree of thermal expansion, causes the pressure in the sealed void 17 between the shell 19 and flexible flow adjustment member 16 to increase dramatically. Thus, the thermally reactive material 18 expands, causing the variable diameter passage 37 to narrow. When live steam reaches the interior cavity 20c and contacts the shell 19, the variable diameter passage 37 closes, thus containing live steam within the steam system. As hot water condensate (not shown) develops within the steam system, it passes through the inlet end 20a of the housing 20 into the interior cavity 20c. The condensate at least partly fills the interior cavity 20c and contacts the shell 19, causing the thermally reactive material 18 to cool and, consequently, to rapidly contract, thereby permitting the variable diameter passage 37 to open so that condensate can pass from the steam system.

Having described the general operation of the valve 10, it is appropriate to more fully describe the thermally reactive material 18. As stated above, the material used as the thermally reactive material 18 must expand when subjected to a temperature increase and vice-versa and, therefore, must have a high coefficient of thermal expansion. One critical measure of performance when such valves 10 are used as steam traps is their ability to retain live steam within the steam system while simultaneously releasing condensate from the steam system at a temperature that closely parallels the saturated steam temperature. It has been found that in this respect the performance of the valve 10 is greatly enhanced by configuring the thermally reactive material 18 such that at least a portion of the thermally reactive material 18 undergoes a phase change to vapor as temperature of the steam system increases. In other words, when the valve 10 is used as a steam trap, at least a portion of the thermally reactive material 18 preferably is configured to change phase to vapor in response to an increase in temperature within the interior cavity 20c (and within the steam system). More preferably, a substantial portion of the thermally reactive material 18 is configured to change phase to vapor in response to an increase in temperature in the interior cavity 20c.

To accomplish a change of phase of a substantial portion of the thermally reactive material 18 in accordance with the preferred embodiment, the thermally reactive material 18 is a mixture made from about fifty percent glycerin, forty-five and one-half percent isopropyl alcohol, and four and one-half percent water (each by volume). It should be understood that these volumetric percentages can vary considerably, so long as vaporization of at least a portion of the thermally reactive material 18 occurs during the transition from cooler to warmer temperatures. It is contemplated that other proportions of the above stated ingredients could be employed, or a mixture of different ingredients could be employed, without departing from the scope and spirit of the invention. Indeed, by varying the relative quantities of the various ingredients that make up the thermally reactive material 18, the operating characteristics of the valve 10 can be custom tailored to the particular needs within a system.

Materials that can be used individually or that can be combined to provide the requisite phase change include water, alcohols including methanol, ethanol, propanol, butanol and the like, glycerin, alkylene glycols, including ethylene glycol, propylene glycol, diethylene glycol and the like, and mixtures of the above and other chemical compounds. Additionally, fluorinated and chlorinated hydrocarbons commonly known in the field as FREON compounds, a registered trademark of E.I. du Pont de Nemours & Co., Inc., located in Wilmington, Del., and other compounds well known to those skilled in the art as substitutes or environmentally benign replacements for such FREON-type compounds may be used to accomplish the preferred vaporization of the thermally reactive material 18.

Configuring the valve 10 and particularly the thermally reactive material 18 such that at least a portion of the thermally reactive material 18 vaporizes, the flow of condensate is permitted to pass through the variable diameter passage 37 at an average temperature that generally parallels the average temperature of saturated steam within the steam system within a definable range. The definable range can be varied, as described below, by varying the composition of the thermally reactive material 18. Preferably the range is from zero to about 40 percent. However, the definable range can be much larger, depending on the desired function of the valve 10 within the steam system. Additionally, configuring the thermally reactive material 18 such that at least a portion vaporizes, it is possible to control the degree of oscillation of the temperature of condensate permitted to pass through the variable diameter passage 37. In the preferred embodiment, the average maximum temperature of condensate flow permitted to pass through the variable diameter passage 37 differs from the average minimum temperature of condensate flow permitted to pass through the variable diameter passage 37 by up to about 25 degrees Fahrenheit. (See FIG. 15, discussed more fully before). It should be understood that by varying the mix of ingredients present in the thermally reactive material 18, the degree of oscillation may be reduced to at or about zero degrees Fahrenheit. Accordingly, the valve 10 may be configured to closely maintain a selected set of conditions within the steam system. Significantly, unlike prior art valves, the valve 10 of the present invention does not permit steam to flow through the variable diameter passage once the steam system achieves the saturated steam temperature.

Figure 12:
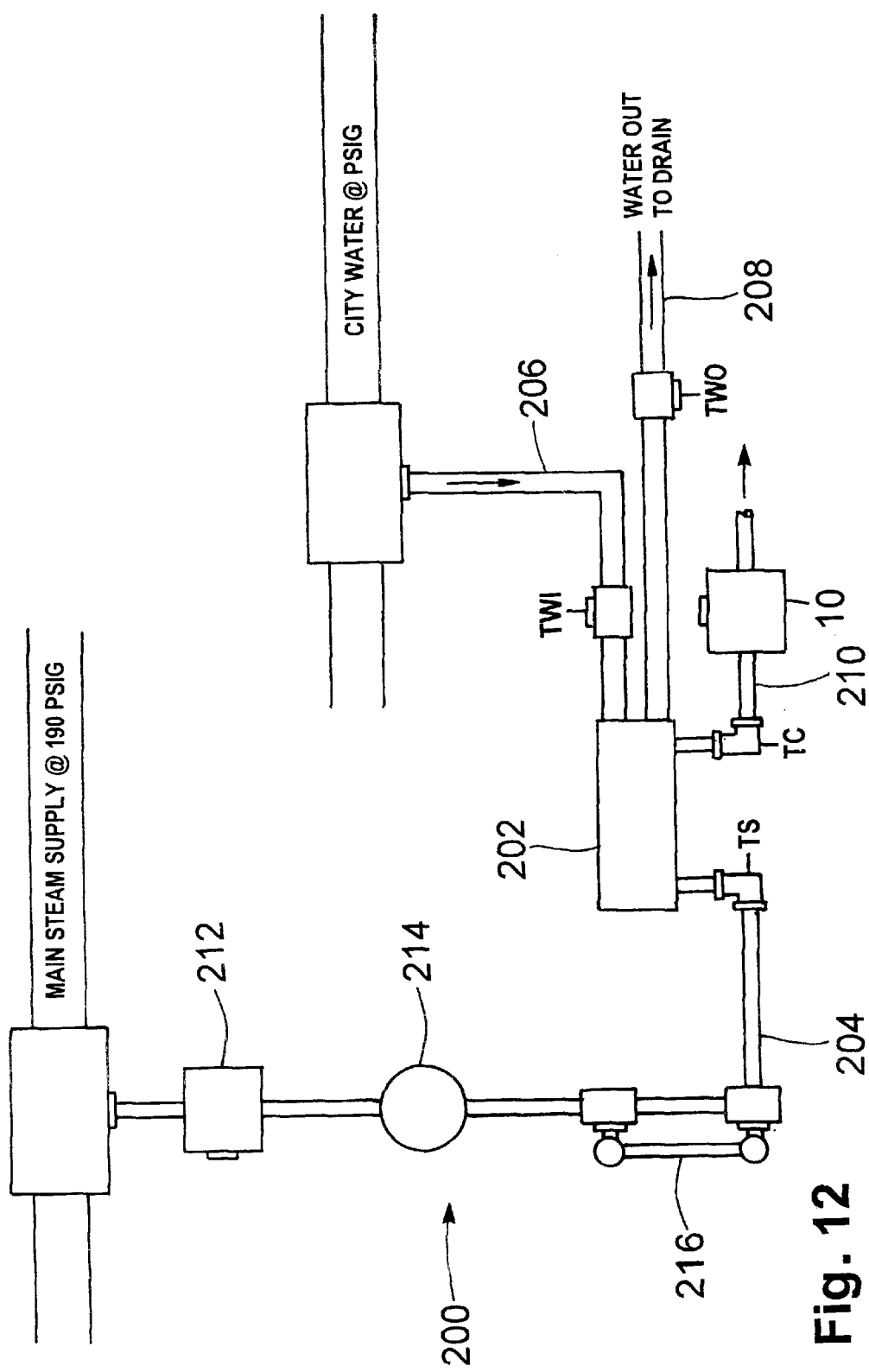
FIG. 12 is a block diagram showing a steam system test apparatus.

Referring now to FIG. 12, there is shown in block form a steam system 200 used to test the ability of the valve 10 to control an output temperature of process water and the temperature of condensate passing through the variable diameter passage 37 of the valve 10. A thermal load is applied to the steam system 200 by a steam-to-water heat exchanger 202. The heat exchanger 202 is a shell-and-tube design with a surface area of 4.3 square feet, a flow capacity of 32 gallons per minute and is available as model number CL-30 from ITT Corporation, Upper Saddle River, N.J. 07458. Steam at saturation temperature and pressure conditions is supplied to the heat exchanger 202 via steam-in line 204. Process water is supplied to the heat exchanger 202 via a water-in line 206 at sixty pounds per square inch (gauge). Water exits the heat exchanger 202 via a water-out line 208 and air, steam and/or condensate exit the heat exchanger 202 via a steam-out line 210. Steam into the heat exchanger 202 is controlled by a solenoid valve 212 and a steam pressure regulator 214. Steam is supplied to the steam pressure regulator 214 at one hundred ninety pounds per square inch (gauge) and the steam pressure regulator 214 was set to maintain approximately fifty pounds per square inch (gauge). The temperature of the saturated steam in the steam system is measured at a point TS approximately ten inches before the heat exchanger 202. The valve 10 is located on the steam-out line 210 and the temperature of condensate flowing through the valve 10 is measured at a point TC located approximately two inches before the valve 10.

The tests were conducted with process water supplied to the heat exchanger 202 at ambient conditions (constant temperature of approximately 45–60° F.) and at a constant rate. The objective of the tests was to maintain a constant water-out temperature (TWO) of 180° F. To accomplish this, the water-out temperature TWO was monitored by a controller (not shown) which actuated the solenoid valve 212 to initiate and terminate the flow of steam to the heat exchanger 202.

Figure 13:
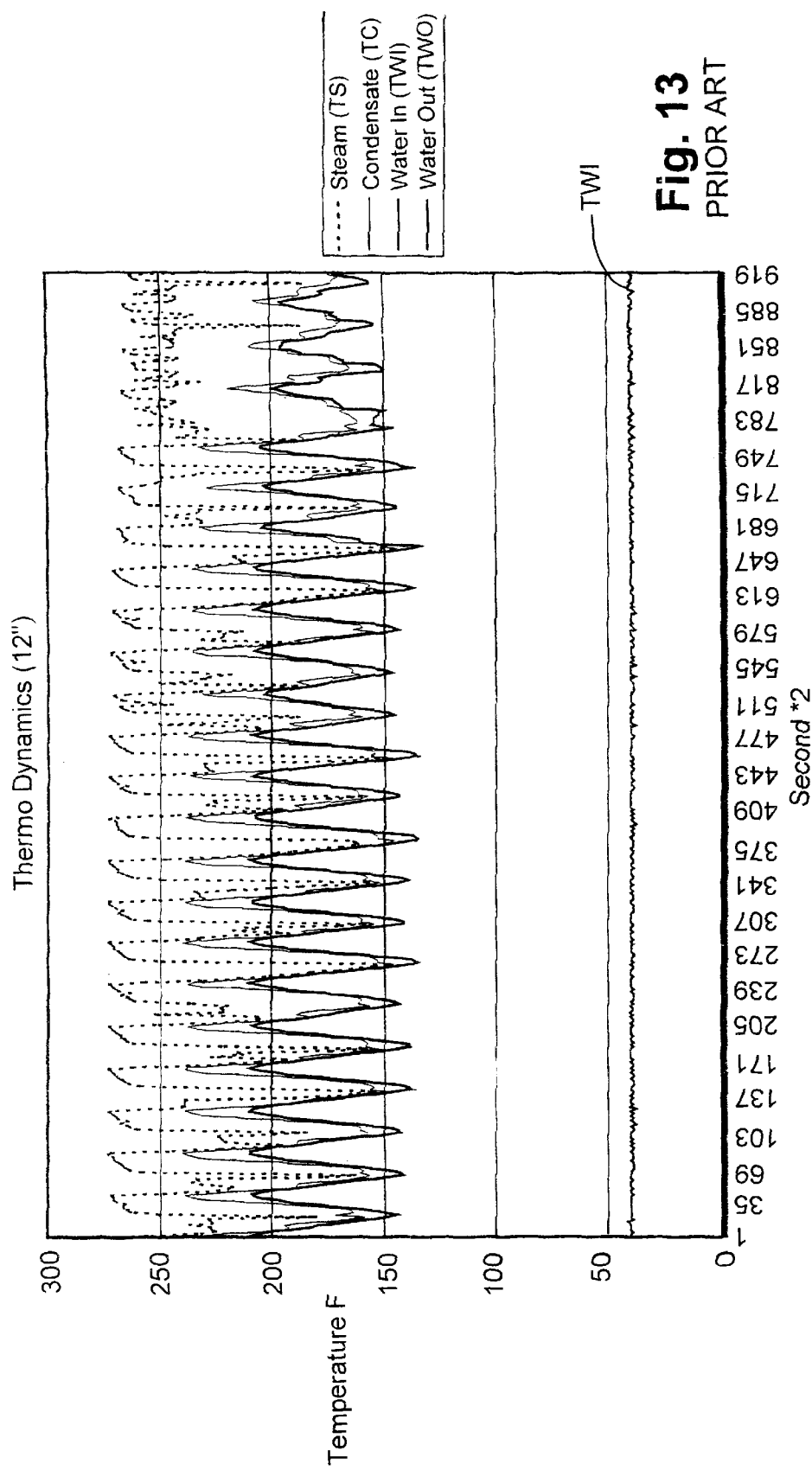
FIG. 13 is a graphical representation of a test of a prior art thermodynamic steam trap performed on the steam system test apparatus shown in FIG. 12.
Figure 14:
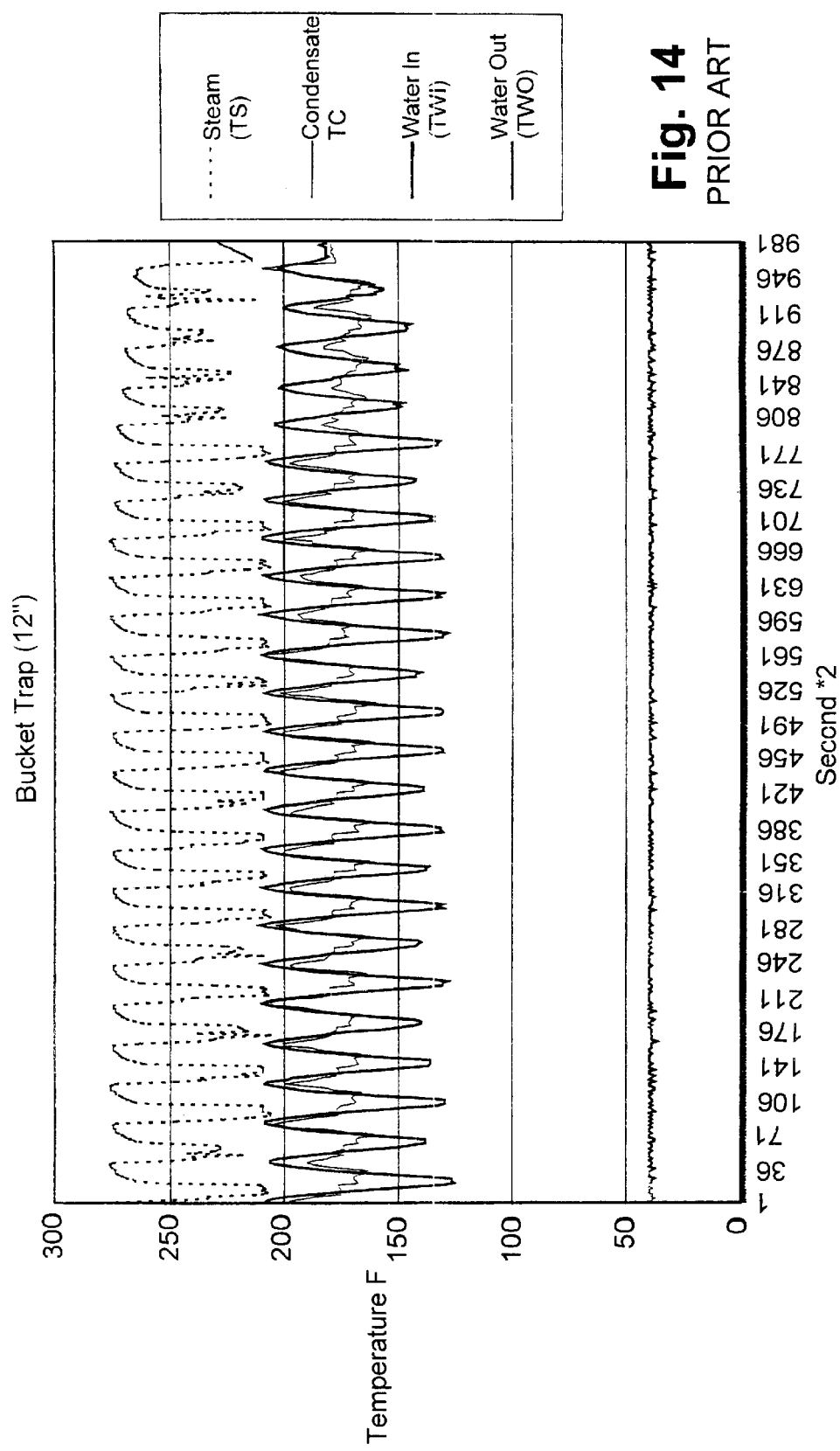
FIG. 14 is a graphical representation of a test of a prior art bucket-type steam trap performed on the steam system test apparatus shown in FIG. 12.

FIGS. 13 and 14 show the results of tests of prior art valves. FIG. 13 shows the results of a one-half inch thermodynamic steam trap (not shown) of a type well known to those skilled in the art. The thermodynamic steam trap was installed in place of the valve 10 in the steam system 200. As can be seen, because of the backup and subsequent purging of condensate within the steam system 200, the results obtained were not satisfactory. Although a constant TWO of 180 degrees Fahrenheit was sought, the temperature varied from minimums of approximately 135–160 degrees Fahrenheit to maximums of approximately 195–210. The temperature of condensate, TC, varied from minimums of approximately 140–170 degrees Fahrenheit. FIG. 14 shows similar results for the same test applied to a one-half inch bucket-type steam trap of the type well known to those skilled in the art. Again, although a constant TWO of 180 degrees Fahrenheit was sought, the result was not achieved. TWO varied from minimums of approximately 125–160 degrees Fahrenheit and maximums of approximately 200–210 degrees Fahrenheit. TC varied from minimums of approximately 160–170 degrees Fahrenheit to maximums of approximately 180–210 degrees Fahrenheit. Clearly neither prior art valve demonstrates satisfactory ability to permit control of a process water temperature (TWO).

Figure 15:
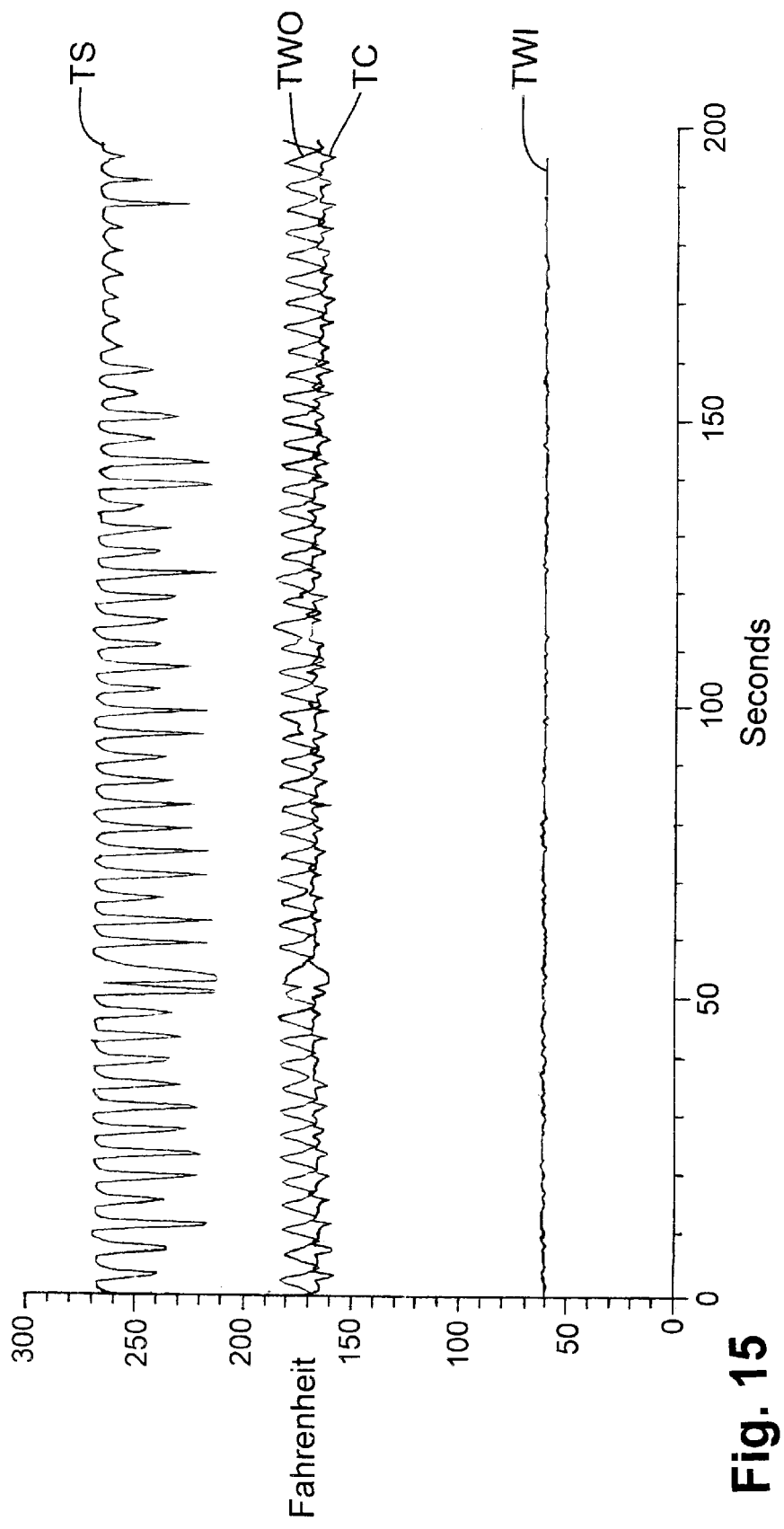
FIG. 15 is a graphical representation of a test of the valve of the preferred embodiment as shown in FIG. 1, performed on the steam system test apparatus shown in FIG. 12.

Referring now to FIG. 15, there is shown the test results for the valve 10 of the preferred embodiment having a thermally reactive material 18 made of a mixture containing fifty percent glycerin, forty-five and one-half percent isopropyl alcohol, and four and one-half percent water, each by volume. Again the objective of the test was to maintain a process water temperature (TWO) of 180 degrees Fahrenheit. TWO was maintained within maximum of between 183 and 190 degrees Fahrenheit and minimum temperature of between 165–175. TC was maintained between a maximum temperature of between 165–170 degrees Fahrenheit and a minimum temperature of between 158–163 degrees Fahrenheit. The difference between averages of all minimum TC peaks and maximum TC peaks is roughly 3–4 degrees Fahrenheit. As can be discerned from a comparison between the prior art thermodynamic and bucket type valves and the valve 10 of the preferred embodiment, the valve 10 demonstrates a dramatic improvement over the prior art valves in terms of regulating the temperature (TC) of condensate permitted to pass through the variable diameter passage 37 and, accordingly, the output temperature of process water (TWO). It will be recognized by those skilled in the art that a water-out temperature TWO which is substantially constant at the desired temperature demonstrates an efficiently-operating steam-to-water heat exchange. Efficiency in the exchange of heat between the steam and water, particularly in a small heat exchanger 202 such as that employed in these tests, depends substantially on the efficient removal of condensate from the steam system 200, which is reflected by the near constant condensate-out temperature (TC). As is clearly demonstrated in FIG. 15, the valve 10 was extremely effective at removing efficiency-reducing condensate from the steam system 200 as evidenced by the near constant water-out temperature TWO. The effectiveness of the valve 10, and the fact that live steam was not expelled through the valve 10, is further demonstrated in the proximity of the temperature of condensate TC expelled through the valve 10 and the water-out temperature TWO.

As one skilled in the art will recognize having read this disclosure, and particularly as can be deduced from the test results shown in FIG. 15, the valve 10 is quick acting and self-regulating, such that the modulator 40 begins to quickly and automatically pinch off or open the variable diameter passage 37 as the thermally reactive material 18 expands and vaporizes with the passage of hot materials and contracts and condenses with the passage of cooler materials. Accordingly, steam is not permitted to flow through the variable diameter passage once the steam system achieves the saturated steam temperature.

The self-modulating action of the valve 10 also provides the benefit of minimizing failure caused by contamination such as dirt or scale (not shown). If dirt or scale particles begin to plug the variable diameter passage 37, the valve 10 will cool because of the reduced flow, the thermally reactive material 18 will contract, and the variable diameter passage 37 will begin to open, allowing the contamination to pass. The variable diameter passage 37 will then adjust back to its original modulated size based on the load.

It will be recognized that the design of the valve 10 described hereinabove provides the substantial benefit of greatly increased life compared with prior art designs. Responding automatically to condensate temperatures, the valve 10 also greatly reduces the cost of installing and maintaining traps (not shown), eliminates down time in systems and product loss due to failed traps or valves of prior art designs, and greatly increases energy efficiency by eliminating live steam loss. The reaction time is less than that of prior art designs due to the immersion of the shell 19 in the fluid medium reaching the valve 10. The performance of the valve 10 is greatly increased over prior art designs due to the use of the thermally reactive material 18 disclosed herein, that changes phase in response to a change in temperature. When used as a steam trap, the increased efficiency and capacity of the valve 10 of the present invention, when compared with prior art designs, provides substantial benefits when used in such applications as drip legs, winterizing steam tracing, process steam tracing, maintaining analyzer sample lines, or when used in autoclaves, radiators, or for instrument enclosure heater discharge. Alternatively, uses for the valve 10 of the present invention include, but by no means are limited to, temperature control, freeze protection, scald protection, etc. It is contemplated that the valve 10 may have application.

Referring now to FIGS. 5–7 and 11, as stated above, the shell 19 is compressed onto the remainder of the modulator 40 through the use of a compression tool 100. The compression tool includes a base plate 164 having a first end 164a and an opposing second end 164b, and a segmented cone 102 which sits atop the base plate 164 and within which is disposed a modulator 40 for compression of its shell 19. A retainer plate 162 is disposed atop the base plate 164 and a receiver 124 is seated upon and fastened to the retainer plate 162 and is disposed radially outwardly from the segmented cone 102. An end plug 142 is attached to the second end 124b of the receiver 124. Disposed adjacent to the end plug 142 and within the receiver 124 and adjacent to the second cylindrical portion 128 is a plunger 152 and first resilient member 154. The first resilient member 154 contacts the end plug 142 at one end and at its opposite end contacts the plunger 152. The plunger 152 contacts the first resilient member 154 at its upper end and the second end 102a of the segmented cone 102 at its lower end. A second resilient member 123 is disposed within a longitudinal bore 112 of the segmented cone 102 and elastic members 125 are disposed within the segmented cone 102 as further described below.

Figure 5:
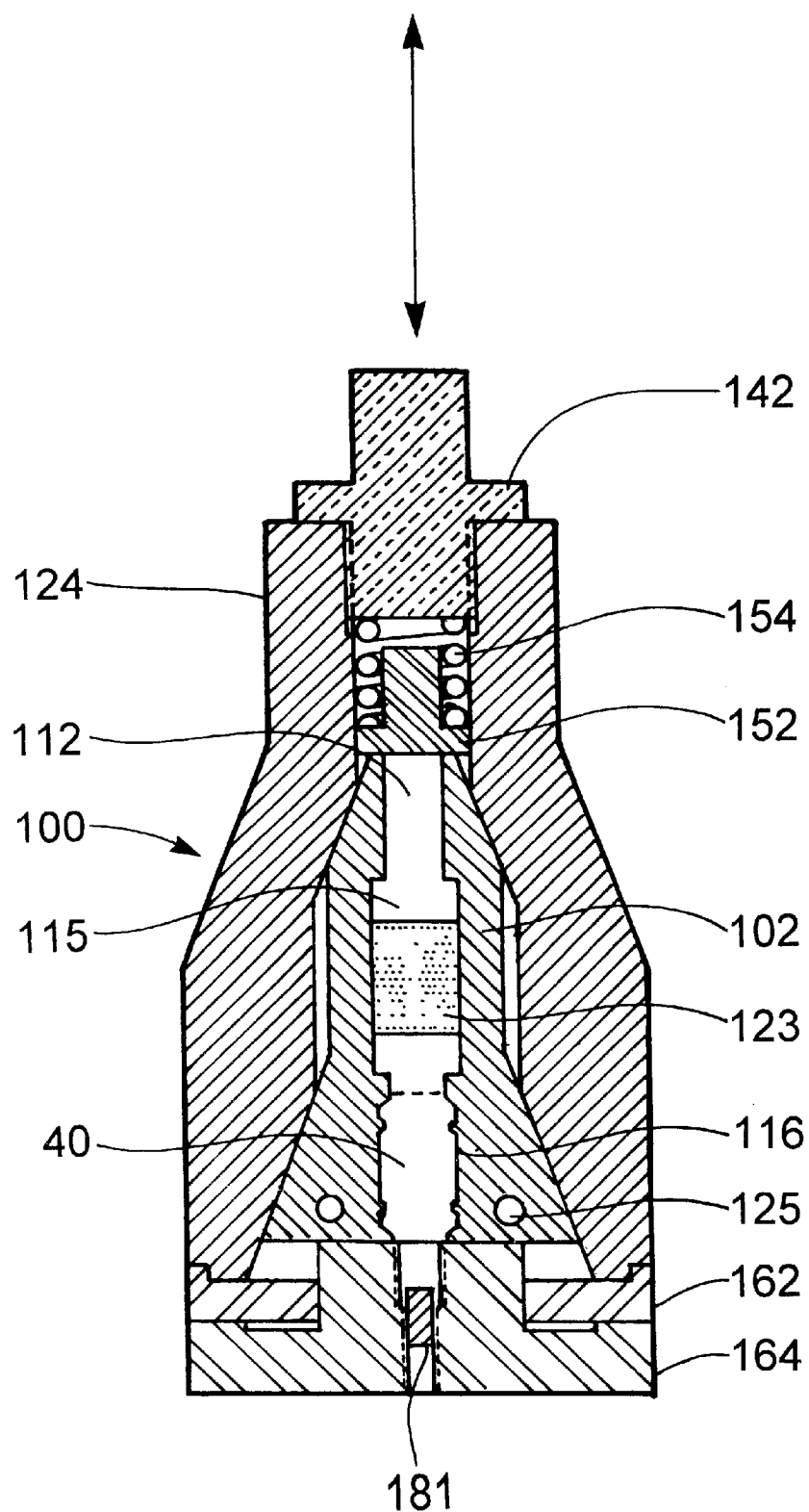
FIG. 5 is a cross-sectional view of a preferred embodiment of a compression tool used to assemble the modulator shown in FIG. 4.
Figure 6:
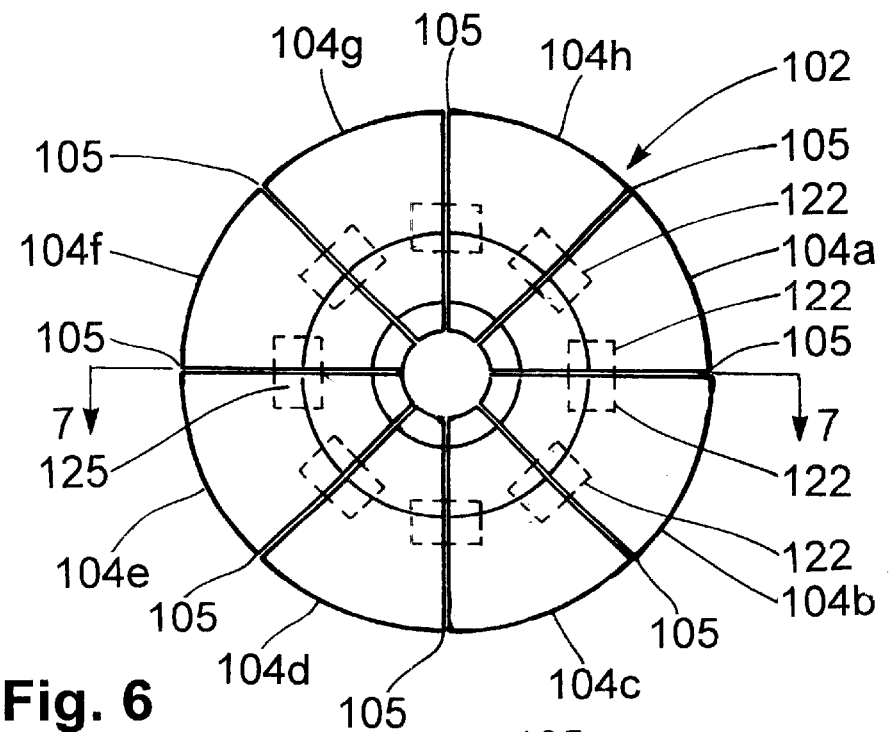
FIG. 6 is a top plan view of a segmented cone assembly of the compression tool shown in FIG. 5.
Figure 7:
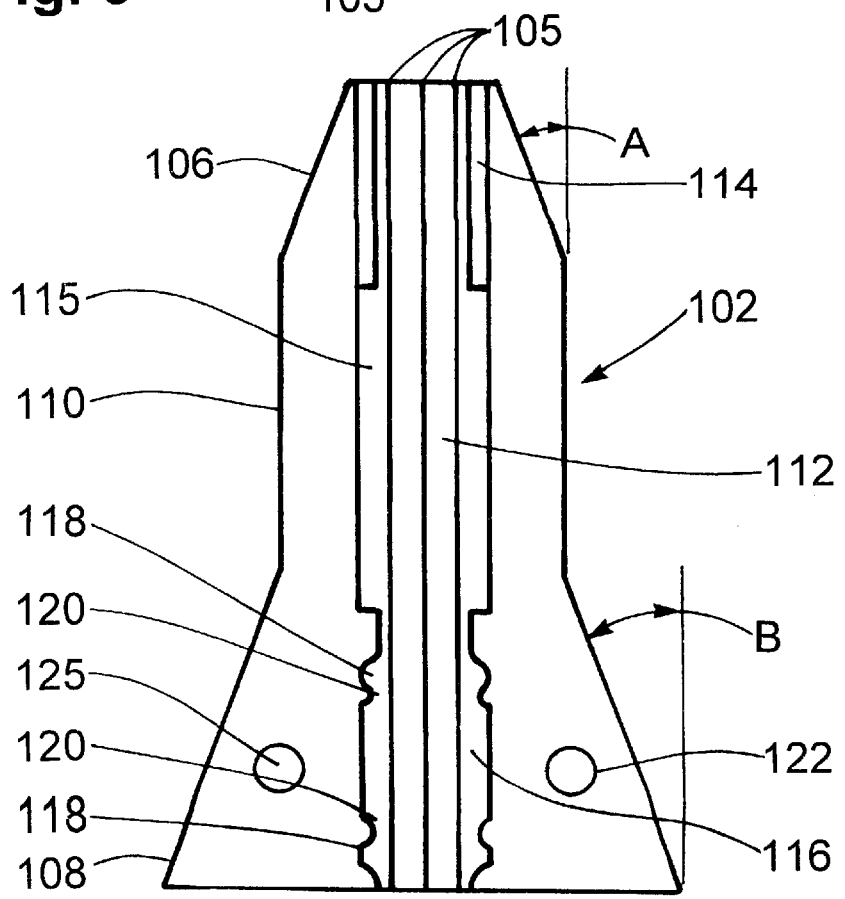
FIG. 7 is a cross-sectional view of the segmented cone assembly shown in FIG. 6 taken along line 7—7 of FIG. 6.

Referring now to FIGS. 5–7, the segmented cone 102 has a first end 102a and an opposed second end 102b and consists of eight longitudinal segments 104a through 104h. The individual segments 104a through 104h are preferably made by making radial cuts 105 through a unitary segmented cone (not shown) such that each segment 104a through 104h has two longitudinal faces 103 and the longitudinal face 103 of one longitudinal segment 104a through 104h is adjacent to the longitudinal face 103 of the adjacent longitudinal segment 104a through 104h. A description of the method of making the cuts is omitted for purposes of brevity as such methods are well known to those skilled in the art. Preferably the cuts through the unitary segmented cone are 0.025 inches wide. Those skilled in the art will recognize upon reading this disclosure that the cuts need not be 0.025 inches wide, but may be any width that permits the segmented cone 102 to compress the shell 19 yet remain relatively easily retractable, once compression of the shell 19 is complete. The segmented cone 102 is preferably made of a high-strength light-weight material, such as AH-5 tool steel having a hardness of Rc 55-58.

Referring now to FIG. 7, the outer shape of the segmented cone 102 consists of a second frusto-conical surface 106 adjacent to the second end 102b of the segmented cone 102, a first frusto-conical surface 108 adjacent to the first end 102a of the segmented cone 102, and a cylindrical surface 110 disposed therebetween. The second frusto-conical surface 106 and first frusto-conical surface 108 have angles of inclination A, B of 20 degrees. Those skilled in the art upon reading this disclosure will recognize that the angle of inclination A, B of the second and first frusto-conical surfaces 106, 108 should be identical or nearly identical to provide uniform compression along the length of the shell 19 (as will be discussed below) but may be other than twenty degrees without departing from the spirit and scope of the invention. A longitudinal bore 112 passes longitudinally through the center of the segmented cone 102. At the end of the longitudinal bore 112, corresponding with the second frusto-conical surface 106, is an internal throat 114, the function of which will become apparent below. At the opposite end of the longitudinal bore 112 is the forming section 116, which imparts the final formed shape to the shell 19 in the process described below. The forming section 116 includes two circumferential channels 118 and two circumferential ridges 120, the combination of which form the circumferential indentations 42, 44 (best shown in FIG. 4) and rounded over ends 46, 48 on the shell 19.

Each segment 104a through 104h of a preferred embodiment of the segmented cone 102 has a cavity 122 in each longitudinal face 103 which corresponds with and opposes a cavity 122 on the adjacent, opposing longitudinal face 103. Preferably, the cavities 122 are flat bottomed. Disposed within each opposing pair of cavities 122 in adjacent longitudinal faces 103 of segments 104a through 104h are the elastic members 125, which assist in maintaining proper spacing of the segments 104a through 104h during assembly of the compression tool 100 and subsequent compression of the shell 19. Consistent spacing of the segments 104a through 104h assists in distributing the compressive load on the shell 19 evenly around the circumference of the shell 19. The elastic members 125 provide the additional benefit of assisting in separating the segments 104a through 104h following compression of the shell 19. The elastic members 125 are generally cylindrically shaped and are made of elastomeric material which preferably is rubber. Those skilled in the art will recognize upon reading this disclosure that other means could be used to properly space and separate the segments 104a–104h, such as configuring resilient retainer plates (not shown) to fit between corresponding faces of each segment 104a–104h, or springs could be used, without departing from the spirit and scope of the invention.

Referring to FIGS. 5–7, the second resilient member 123 is disposed within the longitudinal bore 112 to assist in radially expanding the segments 104a through 104h following compression of a shell 19 to form a modulator 40. The second resilient member 123 is retained within a chamber 115 bounded within the segmented cone 102 by the internal throat 114 at the top of the chamber 115 and by the forming section 116 at the bottom of the chamber 115. The second resilient member 123 is preferably made from an elastomeric material such as urethane rubber and is preferably formed in the shape of a solid cylinder. Those skilled in the art will recognize that the second resilient member 123 may be made in any shape that would permit placement within the longitudinal bore 112 and may be made from any resilient material. Alternative structures for separating the segments 104a through 104h following compression of the shell 19 are spheres or they could be egg shaped.

Referring now to FIGS. 5 and 8, the compression tool 100 also includes a receiver 124 for receiving the segmented cone 102 during use of the compression tool 100. The receiver 124 is preferably made of a high-strength, light weight material, such as steel. Those skilled in the art will recognize upon reading this disclosure that the receiver 124 could be made from any material having sufficient hardness and tensile strength to force the segments 104a through 104h together as the receiver 124 is forced over the segments 104a through 104h. As best shown in FIG. 8, the receiver 124 has a first end 124a, an opposing second end 124b, and an internal passage 126 passing longitudinally through the receiver 124. The internal passage 126 includes a first conical portion 130 adjacent to the first end 124a, a first cylindrical portion 132 adjacent to the first conical portion 130, a second conical portion 128 adjacent to the first cylindrical portion 132, and a second cylindrical portion 139 adjacent to the second conical portion 128 and the second end 124b. At the outboard end of the second cylindrical region 139 is a set of internal threads 140 for attachment of the end plug 142, as discussed below. The internal threads 140 are preferably straight machine screw threads, however, threads of virtually any nature could be employed without departing from the spirit and scope of the invention. The receiver 124 also has a circumferential groove 138 at its end opposite from the threads 140. The function of the circumferential groove 138 is described below.

Referring to FIGS. 5, 8, and 9, an end plug 142 is attached to the end of the receiver 124. The end plug 142 is preferably made of steel. The end plug 142 has external threads 144 which mate with internal threads 140 in the internal passage 126 of the receiver 124 and which are preferably straight machine screw threads. The end plug 142 could be fixed to the receiver 124 by alternative means such as by welding. The end plug 142 also includes a shoulder 146 which permits the end plug 142 to be securely tightened to the receiver 124 since straight machine threads rather than tapered threads are used. To assist in assembly, the outer surface 148 of the shoulder 146 preferably has a hexagonal shape for engagement with a wrench (not shown). Alternatively, the end plug 142 could have a recess (not shown) in the exposed, upper end 150 having an internal hexagonal shape to receive a hex key (not shown).

Referring to FIGS. 5 and 10, there is shown the plunger 152 and the first resilient member 154. Referring to FIG. 10, the plunger 152 has a contact surface 156 which contacts the second end 102b of the segmented cone 102. The plunger 152 includes a shoulder 158 around its lower circumference which is sized to slide freely within the second cylindrical portion 139 of the receiver 124. The plunger 152 also includes a hub 160 which extends upwardly from the shoulder 158. The first resilient member 154 is disposed over the hub 160 and is, at one end, in engagement with the shoulder 158. The end of the first resilient member 154 opposite the shoulder 158 is in contact with the end plug 142 to assist in disassembly as will be discussed below. Referring to FIGS. 5 and 11, there is shown the retainer plate 162 and base plate 164. As best shown in FIG. 11, the retainer plate 162 has a first end 162a and an opposing second end 162b, and ridge 166 extending upwardly from the second end 162b which mates with the circumferential groove 138 on the end of the receiver 124 and which ridge 166 and groove 138 cooperate to maintain the retainer plate 162 centrally disposed with respect to the receiver 124. The retainer plate 162 is fixedly attached to the receiver 124, preferably by bolts or screws (not shown) passing through the retainer plate 162 and into the bottom end of the receiver 124. The base plate 164 has a first end 164a and an opposing second end 164b.

Alternatively, the retainer plate 162 can be attached to the receiver 124 through mating threads (not shown) on the radially outer surface of the circumferential groove 138 and the radially inner surface of the ridge 166. The retainer plate 162 includes a throughbore 168 having an inner diameter which is sized to slidably engage the outer cylindrical surface 170 of a central hub 172 extending upwardly from the base plate 164. Also extending upwardly from the second end 164b of the base plate 164 is a circumferential, annular hub 176 which, during operation, seats against the end surface 174 of the retainer plate 162 as described below. The base plate 164 is also provided with a mounting hole 178 therethrough having at its lower end internal threads 180 which are adapted for retaining a modulator 40. A set screw 181 is disposed within the portion of the mounting hole 178 nearer the first end of the base plate 164 and has external threads (not shown) which mate with internal threads 180. Disposed within the end of the mounting hole 178 nearer the second end of the base plate 164 are internal threads 182 that engage the external threads 30 of the flanged nipple 12 to secure the modulator 40 into the compression tool 100 during assembly. The retainer plate 162 and base plate 164 are made from high-strength, light-weight material which is dimensionally stable under repeated high compressive loading. The retainer plate 162 and base plate 164 are preferably made of steel. Those skilled in the art will recognize upon reading this disclosure that the retainer plate 162 and base plate 164 may be made from any number of different materials so long as the dimensional stability requirements described above are met.

In operation, the compression tool 100 is assembled and used as follows. Referring to FIGS. 5 through 11, a modulator 40 is joined to the base plate 164 by screwing the external threads 30 on the modulator 40 into the internal threads 182 of the base plate 164. The modulator 40 is screwed into the base plate 164 until the end of the flanged nipple 12 contacts the set screw 181, which is set at a predetermined depth within the mounting hole 178 to achieve consistency in the depth of engagement of the modulator 40. The shell 19, which is in its uncompressed state (not shown), is positioned on the flexible flow adjustment member 16 using a spacing fork (not shown) which is inserted beneath the shell 19 thereby creating a space of predetermined thickness between the shell 19 and the central hub 172. The thickness of the spacing fork is predetermined to work in conjunction with the positioning of the set screw 181 within the mounting hole 178 to locate the shell 19 symmetrically with respect to the end washer 14 and flange 22, in other words, to locate the shell 19 so that an equal amount of the shell 19 extends beyond the end washer 14 and the flange 22. The spacing fork remains in place until the shell 19 is properly positioned and then the spacing fork is removed. The shell 19 maintains its vertical position due to friction between it and the sealing surfaces 34, 36. It is understood by those skilled in the art that instead of the spacing fork, a spring-loaded floater (not shown) could be used to maintain the proper alignment of the shell 19.

To assemble the compression tool 100, the end plug 142 is threaded onto the upper end of the receiver 124, the first resilient member 154 is placed over the hub 160 of the plunger 152, and the first resilient member 154 and plunger 152 are inserted into the second cylindrical portion 139 of the receiver 124 such that the first resilient member 154 is in contact with the end plug 142. The segmented cone 102, in its assembled state having the second resilient member 123 and elastic members 125 installed therein, is placed within the receiver 124, and the retainer plate 162 is attached to the bottom end of the receiver 124. This entire assembly is then set down over the modulator 40 and base plate 164 such that the modulator 40 is received within the forming section 116 and the top surface of the central hub 172 contacts the bottom surface of the segmented cone 102.

A compressive force from an external source (not shown) is exerted against the end plug 124 or, alternatively, against an upper surface of the receiver 124 such that the receiver 124 moves downwardly with respect to the segmented cone 102. As the receiver 124 travels downwardly with respect to the segmented cone 102, the second conical portion 128 of the receiver 124 corresponds with the smaller frusto-conical portion 106 of the segmented cone 102, the first conical portion 130 of the receiver 124 corresponds with the first frusto-conical surface 108 of the segmented cone 102, and the first cylindrical portion 132 of the receiver 124 corresponds with the cylindrical portion 110 of the segmented cone 102. The correspondence of these features causes the segments 104a through 104h to draw radially inwardly as the receiver 124 travels downwardly with respect to the segmented cone 102, thereby compressing the shell 19 within the forming section 116. The downward movement of the receiver 124 also causes the second end 102b of the segmented cone 102 to force the plunger 152 upwardly causing compression of the resilient member 154. Downward movement of the receiver 124, by causing radially inward movement of the segments 104a through 104h and thus decreasing the diameter of the longitudinal bore 112, also causes the second resilient member 123 and elastic members 125 to become compressed. The useful function of this compression will become apparent below.

Force is applied until the circumferential hub 176 of the base plate 164 contacts the bottom surface of the retainer plate 162, whereupon compression of the shell 19 is complete. As best shown in FIGS. 5 and 11, the downward travel of the receiver 124, and, correspondingly, the degree of compression of the shell 19, can be easily adjusted by varying the thickness of the circumferential hub 176. Having completed the compression of the shell 19 to form a modulator 40, the compression tool 100 is retracted to remove the modulator 40. In this regard, the external source of compressive force is removed whereupon the compressed first resilient member 154, second resilient member 123, and elastic members 125 act to assist in retraction of the compression tool 100. The first resilient member 154 exerts force against the end plug 142 and against the second end 102b of the segmented cone 102 such that the receiver 124 is thrust upwardly with respect to the segmented cone 102, thereby permitting the second resilient member 123 and elastic members 125 to thrust the segments 104a through 104h radially outwardly such that the modulator 40 may be removed.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

What is claimed is:

1. A valve for automatically modulating a flow of fluid, the valve comprising:
   a flexible flow adjustment member having a variable diameter passage therethrough and an outer surface, wherein the flexible flow adjustment member is made from VITON;
   a shell surrounding at least a portion of the outer surface and creating a void between the shell and the outer surface, the shell being in contact with the flow of fluid; and
   a thermally reactive material that expands when heated and contracts when cooled, the thermally reactive material being within the void and in contact with the outer surface of the flexible flow adjustment member for exerting pressure thereon in response to a heating of the thermally reactive material to cause a diameter of the variable diameter passage to decrease and to relieve pressure thereon in response to a cooling of the thermally reactive material to permit the diameter of the variable diameter passage to increase, a substantial portion of the thermally reactive material being configured to change phase to vapor in response to an increase in temperature within the internal cavity.

2. A valve for automatically modulating a flow of fluid, the valve comprising:
   a flexible flow adjustment member having a variable diameter passage therethrough and an outer surface, wherein the flexible flow adjustment member is made from VITON GF300;
   a shell surrounding at least a portion of the outer surface and creating a void between the shell and the outer surface, the shell being in contact with the flow of fluid; and a thermally reactive material that expands when heated and contracts when cooled, the thermally reactive material being within the void and in contact with the outer surface of the flexible flow adjustment member for exerting pressure thereon in response to a heating of the thermally reactive material to cause a diameter of the variable diameter passage to decrease and to relieve pressure thereon in response to a cooling of the thermally reactive material to permit the diameter of the variable diameter passage to increase, a substantial portion of the thermally reactive material being configured to change phase to vapor in response to an increase in temperature within the internal cavity.

3. A valve comprising:

a housing having a wall defining an interior cavity;

a modulator mounted within the interior cavity, the modulator including:
 a shell in fluid communication with the interior cavity;
 a flexible flow adjustment member within the shell, the flexible flow adjustment member having a variable diameter passage therethrough, the variable diameter passage being in fluid communication with the interior cavity, wherein the flexible flow adjustment member is made from VITON;
 a void between the flexible flow adjustment member and the shell; and
 a thermally reactive material within the void and in contact with the shell for thermal communication therebetween, at least a portion of the thermally reactive material being configured to change phase to vapor in response to an increase in temperature within the interior cavity.

4. A valve comprising:

a housing having a wall defining an interior cavity;

a modulator mounted within the interior cavity, the modulator including:
 a shell in fluid communication with the interior cavity;
 a flexible flow adjustment member within the shell, the flexible flow adjustment member having a variable diameter passage therethrough, the variable diameter passage being in fluid communication with the interior cavity, wherein the flexible flow adjustment member is made from VITON GF300;
 a void between the flexible flow adjustment member and the shell; and
 a thermally reactive material within the void and in contact with the shell for thermal communication therebetween, at least a portion of the thermally reactive material being configured to change phase to vapor in response to an increase in temperature within the interior cavity.

5. A valve comprising:

a housing having a wall defining an interior cavity;

a modulator mounted within the interior cavity, the modulator including:
 a shell in fluid communication with the interior cavity;
 a flexible flow adjustment member within the shell, the flexible flow adjustment member having a variable diameter passage therethrough, the variable diameter passage being in fluid communication with the interior cavity;
 a void between the flexible flow adjustment member and the shell; and
 a thermally reactive material within the void and in contact with the shell for thermal communication therebetween, at least a portion of the thermally reactive material being configured to change phase to vapor in response to an increase in temperature within the interior cavity;

the housing further including a radially inwardly extending throat, the modulator being mounted to the throat.

6. The valve of claim 5, further comprising:

an end washer having an orifice therethrough and an outer circumferential edge, the end washer positioned at a second end of the flexible flow adjustment member, the orifice being in fluid communication with the variable diameter passage, the outer circumferential edge of the washer being sealingly engaged to the flexible flow adjustment member; and a flanged nipple having a bore therethrough and a flange at a first end of the nipple, the flange being sealingly engaged with a first end of the flexible flow adjustment member, the bore being in fluid communication with the variable diameter passage, and a second end of the flanged nipple being connected to the throat.

* * * * *